(12) United States Patent
Yan

(10) Patent No.: US 9,656,668 B2
(45) Date of Patent: May 23, 2017

(54) AUTOMOBILE ANTI-COLLISION AND ANTI-MISOPERATION THROTTLE SYSTEM WITH REPLY FOR CONTROLLING POSITIVE-NEGATIVE ROTATION OF MOTOR

(71) Applicant: ZHEJIANG XIANAN AUTOMOBILE BREAKING SYSTEM CO., LTD., Taizhou, Zhejiang (CN)

(72) Inventor: Changsong Yan, Sichuan (CN)

(73) Assignee: ZHEJIANG XIANAN AUTOMOBILE BREAKING SYSTEM CO., LTD, Taizhou, Zhejiang (CN)

( * ) Notice: Subject to any disclaimer, the term of this patent is extended or adjusted under 35 U.S.C. 154(b) by 33 days.

(21) Appl. No.: 14/786,545

(22) PCT Filed: Apr. 22, 2014

(86) PCT No.: PCT/CN2014/075988
§ 371 (c)(1),
(2) Date: Oct. 23, 2015

(87) PCT Pub. No.: WO2014/173294
PCT Pub. Date: Oct. 30, 2014

(65) Prior Publication Data
US 2016/0082956 A1    Mar. 24, 2016

(30) Foreign Application Priority Data

Apr. 23, 2013  (CN) .......................... 2013 1 0141481

(51) Int. Cl.
*B60W 30/09* (2012.01)
*B60W 10/18* (2012.01)
(Continued)

(52) U.S. Cl.
CPC ............... *B60W 30/09* (2013.01); *B60T 7/22* (2013.01); *B60T 17/221* (2013.01); *B60W 10/04* (2013.01);
(Continued)

(58) Field of Classification Search
CPC ......... B60W 30/09; B60W 10/18; B60T 7/22; B60T 17/221
See application file for complete search history.

(56) References Cited

U.S. PATENT DOCUMENTS

2011/0307139 A1* 12/2011 Caminiti ................ G08G 1/163
701/32.2

* cited by examiner

*Primary Examiner* — Basil T Jos

(57) ABSTRACT

An automobile anti-collision and anti-misoperation throttle system with a relay for controlling positive-negative rotation of a motor relates to a system which directly transforms automobile anti-collision signals and throttle-misoperation signals into brake operating signals. The sensor switch (K0) is connected to and controls the relay reversed power controller (2), the relay reversed power controller (2) controls and supplies electric power to the limit-switch-integrated motor assembly (3), the limit-switch-integrated motor assembly (3) drives the sleeved stretching rope (4), the limit-switch-integrated motor assembly (3) also cuts off a reversed power circuit of the relay reversed power controller (2), and the sleeved stretching rope (4) transmits a motor rotation drift of the limit-switch-integrated motor assembly (3) to the automobile brake pedal (5); the sensor switch K0 is connected to the anti-collision controller (11) in parallel, for respectively controlling the automobile brake pedal (5).

5 Claims, 1 Drawing Sheet

(51) Int. Cl.
  *B60T 7/22* (2006.01)
  *B60T 17/22* (2006.01)
  *B60W 10/04* (2006.01)
(52) U.S. Cl.
  CPC ........ *B60W 10/18* (2013.01); *B60T 2201/022* (2013.01); *B60W 2710/18* (2013.01); *B60W 2720/10* (2013.01)

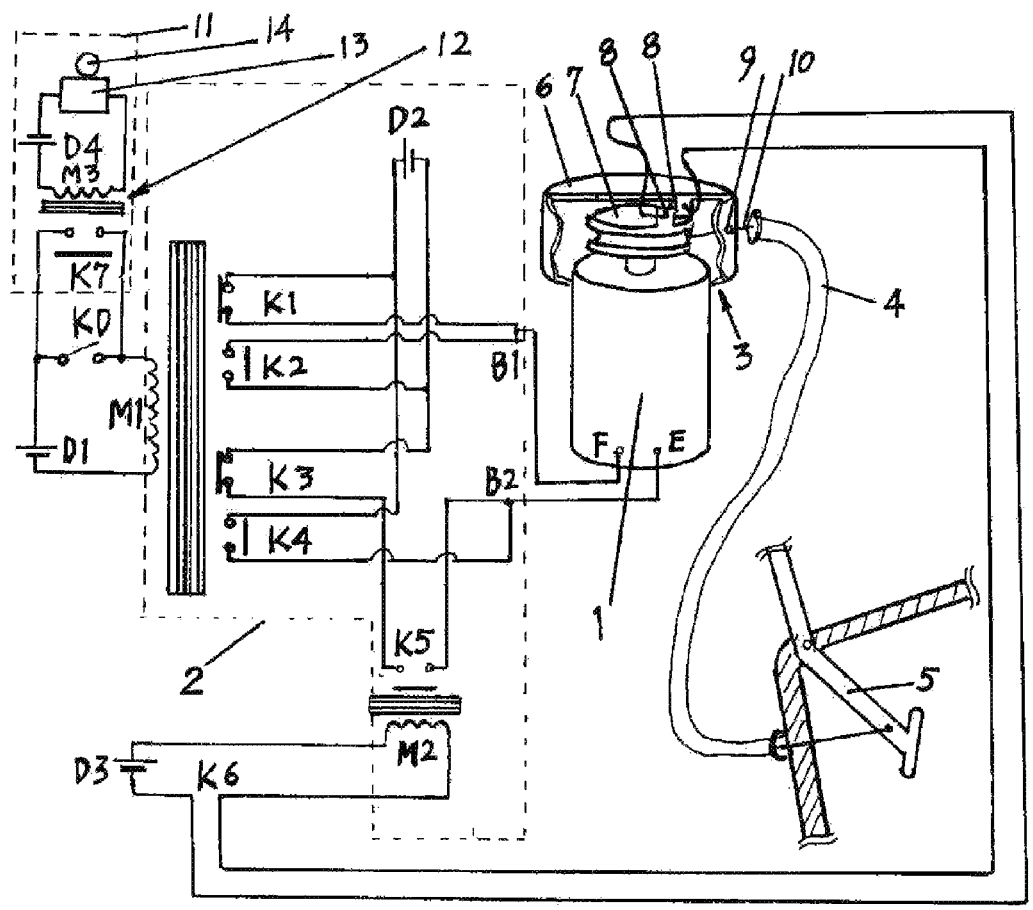

AUTOMOBILE ANTI-COLLISION AND ANTI-MISOPERATION THROTTLE SYSTEM WITH REPLY FOR CONTROLLING POSITIVE-NEGATIVE ROTATION OF MOTOR

CROSS REFERENCE OF RELATED APPLICATION

This is a U.S. National Stage under 35 U.S.C 371 of the International Application PCT/CN2014/075988, filed Apr. 22, 2014, which claims priority under 35 U.S.C. 119(a-d) to CN 201310141481.3, filed Apr. 23, 2013.

BACKGROUND OF THE PRESENT INVENTION

Field of Invention

The present invention relates to a technical field of automobile brake system, and more particularly to a system which directly transforms automobile anti-collision signals and throttle-misoperation signals into brake operating signals.

Description of Related Arts

Chinese granted patent 20051001077.X of the applicant, "Throttle system with an annunciator", discloses system with firstly judges whether a throttle operation is right or wrong, and then decides whether to remedially operate the brake, in such a manner that the throttle becomes a double-function automobile throttle pedal system which is able to both accelerate and brake; wherein an annunciator is provided on a throttle pedal, a linkage device or an automobile body part corresponding to the throttle pedal. The annunciator is connected to an electric valve cutting engine oil circuit and an electric valve starting the brake. Such technology proposes perceiving throttle-misoperation by electronic settings, and outputting brake signals to the electric valve of the oil circuit and the electric valve of the brake for remedially braking. One disadvantage of such technology is that when a signal reading device for judging and extracting throttle-misoperation signals from continuously-changing pressure signals detected by the annunciator is out of order, judgment of the throttle-misoperation signal may be wrong, resulting in poor reliability of the system. Another disadvantage of such technology is that signal output wires control the electric valves and the electric valves to shut off the automobile engine oil circuit, igniting circuit, motor power, etc., which prolongs a period between the throttle-misoperation of a driver and a time the automobile is stopped; the automobile has a long error traveled distance, and the slow-response method is not conducive to avoid traffic accident. A third disadvantage of such technology is that signal output wires control the electric valves and the electric valves to shut off the automobile engine oil circuit, igniting circuit, motor power, etc., which completely stops the engine for rotating and working, resulting in stop of automobile safety systems such as brake system, steering system, and anti-skid system; therefore, stopping the automobile engine with the throttle-misoperation signals is not conducive to remedial emergency brake when throttle-misoperation happens.

Chinese patent application 201110030092.4 of the applicant, "Device automatically correcting throttle-misoperation to brake through cooperation of electrical equipment and machine" discloses a device comprises a sensor, a signal analyzer and a brake starting. One disadvantage of the device is that there are too many microelectronic equipments for obtaining throttle-misoperation signals, which decreases reliability. Another disadvantage of the in the brake starting mechanism, circular motion of the motor is transformed into a reciprocating motion of the brake rope with a straight rack; because the straight rack needs to be positioned to ensure the reciprocating motion, a frame needs to be provided for fixing a relative position of the motor and the straight rack, wherein the frame has a large volume, and is difficult to find a suitable mounting location for; furthermore, the structure is complex, cost is high and reliability is poor.

There are three main states of the throttle-misoperation correcting system: braking when accident happens, lifting brake when the accident released, and resetting. However, shifting between the three states of the conventional throttle-misoperation correcting system uses a microelectronic controller for starting the brake and backwardly releasing the brake. Microelectronic circuit has poor reliability due to signal drift, etc.

SUMMARY OF THE PRESENT INVENTION

An object of the present invention is to provide an automobile anti-collision system which decelerates an automobile to keep a safe distance when a blocker is ahead; to provide a remedial brake system for throttle-misoperation when a driver steps on a throttle pedal by mistake; and to provide an integrated system of the above systems with sufficient reliability.

A concept of the present invention is that: because reliability of a relay is far better than a microelectronic controller, a plurality of relay switches are used for control an automobile anti-collision and anti-misoperation remedial brake system.

According to the present invention, elements and connection thereof are as follows:

The present invention provides an integrated system of an anti-collision system and an anti-misoperation throttle system, wherein an anti-collision controller is used as a starting controller of the anti-collision system, and a sensor switch K0 is used as a starting controller of the anti-misoperation throttle system; an output end switch K7 of the anti-collision controller is connected to the sensor switch K0 in parallel, the above systems share a relay reversed power controller and a limit-switch-integrated motor assembly as a part for executing braking.

An automobile anti-collision and anti-misoperation throttle system with a relay for controlling positive-negative rotation of a motor comprises: a sensor switch K0, a sleeved stretching rope 4, an automobile brake pedal 5 and batteries, wherein the automobile anti-collision and anti-misoperation throttle system further comprises a relay reversed power controller 2, a limit-switch-integrated motor assembly 3 and an anti-collision controller 11; wherein the sensor switch K0 is connected to and controls the relay reversed power controller 2, the relay reversed power controller 2 controls and supplies electric power to the limit-switch-integrated motor assembly 3, the limit-switch-integrated motor assembly 3 drives the sleeved stretching rope 4, the limit-switch-integrated motor assembly 3 also cuts off a reversed power circuit of the relay reversed power controller 2, and the sleeved stretching rope 4 transmits a motor rotation drift of the limit-switch-integrated motor assembly 3 to the automobile brake pedal 5; the sensor switch K0 is connected to the anti-collision controller 11 in parallel, for respectively controlling the automobile brake pedal 5;

wherein the relay reversed power controller 2 comprises a switch set and a fifth controlled switch K5; wherein the switch set comprises a first control coil M1, a first controlled switch K1, a second controlled switch K2, a third controlled switch K3 and a fourth controlled switch K4; wherein connection thereof is: a first end of the first controlled switch K1 and a first end of the second controlled switch K2 are connected to each other for being a first output end B1 of the relay reversed power controller 2, a second end of the first controlled switch K1 is connected to a positive electrode of a second battery D2, a second end of the second controlled switch K2 is connected to a negative electrode of the second battery D2; a first end of the third controlled switch k3 is connected to the fifth controlled switch K5 in series, and then the fifth controlled switch K5 is connected to the fourth controlled switch K4 for being a second output end B2 of the relay reversed power controller 2, a second end of the third controlled switch K3 is connected to the negative electrode of the second battery D2, and an end of the fourth controlled switch K4 is connected to the positive electrode of the second battery D2; a control end of the fifth controlled switch K5 is a second control coil M2; the first output end B1 and the second output end B2 are respectively connected to a direct current geared motor 1 of the limit-switch-integrated motor assembly 3;

wherein the limit-switch-integrated motor assembly 3 comprises the direct current geared motor 1, a shell 6 and a rotation plate 7, wherein the rotation plate 7 is mounted on an output shaft of the direct current geared motor 1 and is provided inside the shell 6, and the shell 6 is mounted on a shell body of the direct current geared motor 1; between the shell 6 and the rotation plate 7, two electrical contacting pins 8 are respectively provided on the shell 6 and the rotation plate 7; when the rotation plate 7 rotates to a certain position, the electrical contacting pins 8 of the shell 6 and the rotation plate 7 contact with each other for conducting electricity or separate for interrupting electricity;

wherein a stretching rope hole 9 is provided on the shell 6, a first end of a driving wire 10 in the sleeved stretching rope 4 is connected to the rotation plate 7 through the stretching rope hole 9; a second end of the driving wire 10 is connected to the automobile brake pedal 5, two ends of a sleeve of the sleeved stretching rope 4 are respectively connected to the shell 6 of the limit-switch-integrated motor assembly 3 and an automobile body part corresponding to the automobile brake pedal 5;

wherein a control circuit of the sensor switch K0 is a closed circuit comprising the sensor switch K0, a first battery D1 and the first control coil M1 of the relay reversed power controller 2 connected to each other in series;

wherein a cut-off reversed power circuit and a device thereof comprise: a closed circuit comprising a control switch K6, a third battery D3 and the second control coil M2 of the relay reversed power controlled 2 connected to each other in series; wherein the control switch K6 comprises the electrical contacting pins 8 of the shell 6 and the rotation plate 7;

wherein a control circuit of the anti-collision controller 11 comprises an anti-collision relay 12, a fourth battery D4, a signal analyzer 13 and a signal detector 14; wherein an output end switch K7 of the anti-collision relay 12 is connected to the sensor switch K0 in parallel; a control signal coil M3 of the anti-collision relay 12, the fourth battery D4 and the signal analyzer 13 are connected to each other in series; the signal analyzer 13 is connected to the signal detector 14, and the signal detector 14 outputs signals to the signal analyzer 13; the signal detector 14 is provided in a front of or/and at a rear of an automobile, no blocker connected to the automobile is provided outside the signal detector 14;

wherein the automobile anti-collision and anti-misoperation throttle system further comprises a throttle pedal and an automobile body part corresponding to the throttle pedal; or a throttle pedal connecting rod and an automobile body part corresponding to the throttle pedal connecting rod;

wherein the sensor switch K0 is provided on a front side of the throttle pedal;

or the sensor switch K0 is provided on a rear side of the throttle pedal, an interval is provided between the sensor switch K0 and the automobile body part corresponding to the throttle pedal; when the throttle pedal moves to a misoperation threshold state position, the sensor switch K0 contacts with the throttle pedal;

or the sensor switch K0 is provided on a surface of the throttle pedal connecting rod facing the automobile, or the sensor switch K0 is provided on the automobile body part corresponding to the throttle pedal connecting rod.

The above elements and connection thereof have functions as follows.

The sensor switch K0 and the anti-collision controller 11 are all circuit switches with a sensor function. Difference is that: the sensor switch K0 collects throttle-misoperation signals of a throttle pedal and a linkage mechanism thereof, and directly uses existence the throttle-misoperation signals as circuit switch signals; the anti-collision controller 11 uses the signal detector 14 to collect distance signals of blocks ahead the automobile, and operates the distance signals and automobile speed signals with the signal analyzer 13 to form circuit switch signals of an output end control switch K7 of the anti-collision controller 11.

The relay reversed power controller 2 is a power control device which transforms two electric conduction states, an on state and an off state, of the sensor switch K0 or the anti-collision controller 11 into a normal power mode, a reversed power mode or a no power mode of the direct current geared motor 1.

When the system is under a standby state, states of the above switches are as follows: the first control coil M1, the first controlled switch K1, the second controlled switch K2, the third controlled switch K3 and the fourth controlled switch K4 are combined as a relay set, the sensor switch K0 is turned off, the first controlled switch K1 is turned on, the second controlled switch K2 is turned off, the third controlled switch K3 is turned on and the fourth controlled switch K4 is turned off; the second control coil M2 and the fifth controlled switch K5 are combined as a relay, and the fifth controlled switch K5 is turned off.

For decelerating brake when a blocker occurs, or for emergency brake when throttle-misoperation happens, a process of outputting normal electric power for braking is as follows: the output end switch K7 of the sensor switch K0 is turned on, the first controlled switch K1 is turned off, the second controlled switch K2 is turned on, the third controlled switch K3 is turned off, and the fourth controlled switch K4 is turned on. A current direction when the direct current geared motor 1 normally rotates for braking is as follows: from the positive electrode of the second battery D2, the fourth controlled switch K4 which is turned on, a positive end E of the direct current geared motor 1, a negative end F of the direct current geared motor 1, the second controlled switch K2 which is turned on, to the negative electrode of the second battery D2; wherein due to rotation of the rotation plate 7, the two pins 8 on the shell 6 and the rotation plate 7 are separated from each other, which means the control switch is turned off, and the fifth controlled switch K5 is turned from off to on. Because the third controlled switch K3 is turned off, the fifth controlled switch K5 is not able to conduct electricity. A reason for turning on the fifth controlled switch K5 is for releasing the brake with a reversed electric power with the accident is avoided. A difference between the decelerating brake and the emergency brake is that a rotation time of the direct current geared motor 1 a target automobile speed are different.

When the blocker disappears or the accident is avoided, a process for releasing the brake with the reversed electric power is as follows: the sensor switch K0 is turned off, the first controlled switch K1 is turned on, the second controlled switch K2 is turned off, the third controlled switch K3 is turned on, the fourth controlled switch K5 is turned off, and the fifth controlled switch K5 is turned on. A current direction when the direct current geared motor 1 reversely rotates for braking is as follows: from the positive electrode of the second battery D2, the first controlled switch K1 which is turned on, the positive end E of the direct current geared motor 1, the negative end F of the direct current geared motor 1, the fifth controlled switch K5 which is turned on, the third controlled switch which is turned off, to the negative electrode of the second battery D2; wherein when the rotation plate 7 rotates to a position where the two pins 8 on the shell 6 and the rotation plate 7 contact with each other, the second control coil turns the fifth controlled switch K5 from on to off, in such a manner that a brake releasing process is completed, and the system recover to the standby state.

When a driver steps on the throttle pedal by mistake and an accident is to happen, the sensor switch K0 is turned on, and the second battery D2 drives the direct current geared motor 1 to normally rotate for braking, wherein a braking time lasts for more than 3 s for stopping the automobile. After the accident is avoided, the driver releases the throttle pedal, then the sensor switch K0 is turned off, and the second battery D2 drives the direct current geared motor 1 to reversely rotate for releasing the brake. When the direct current geared motor 1 reversely rotates to a standby position, the control switch K6 is turned on, and then the fifth controlled switch K5 is turned off, the second battery D2 supplies no more power to the direct current geared motor 1, so as to recover the system to the standby state.

When the automobile speed and the blocker ahead are not within a safe range, the output end switch K7 of the anti-collision controller 11 is turned on, and the second battery D2 drives the direct current geared motor 1 to normally rotate for less than 3 s, so as to complete decelerating braking. When the automobile is decelerated to be in the safe range with the blocker ahead, the output end switch K7 is turned off, and the second battery D2 drives the direct current geared motor 1 to reversely rotate for releasing the brake. Because an unsafe range formed by the automobile speed and a distance between the automobile and the blocker is a continuous variable, a normal rotation time of the direct current geared motor 1 for decelerating braking and a deceleration degree are correlated-changed continuous variables. Decelerating braking is provided with a mechanical structure that the rotation plate 7 of the limit-switch-integrated motor assembly 3 drives the driving wire 10. Therefore, if the automobile speed and the blocker are in the unsafe range again when the direct current geared motor 1 reversely rotates for releasing the brake, the output end switch K7 is able to be instantly turned on, and the direct current geared motor 1 is able to normally rotate instantly for decelerating braking. That is to say, the direct current geared motor 1 is not necessary to be recovered to the standby state, but is able to provide decelerating braking during recovering to the standby state. Such anti-collision decelerating braking function is not limited by a rotation position of the direct current geared motor 1, which fully satisfies a requirement that the unsafe range formed by the automobile speed and a distance between the automobile and the blocker is a continuous variable, so as to satisfy a requirement of starting anti-collision decelerating braking at any time.

The rotation plate 7 mounted on the output shaft of the direct current geared motor 1 has an eccentric wheel structure. When the direct current geared motor 1 normally rotates, the driving wire 10 is connected to a position of the rotation plate 7 where a linear velocity decreases, because when braking starts, the driving wire 10 bears a small force and the automobile brake pedal 5 is required to rapidly move to a braking direction, while when the automobile pedal 5 is at a braking position, the driving wire 10 bears a large force and moves a little. Until the accident is avoided, the automobile brake pedal 5 should be at a final braking position, which requires the direct current motor to be under a locked-rotating state, and applies a largest force on the driving wire 10.

A loop groove is provided on a side wall of the rotation plate 7, the driving wire 10 is connected to the loop groove of the rotation plate 7, and the stretching rope hole 9 of the shell 6 is corresponding to the loop groove of the rotation plate 7, in such a manner that the driving wire 10 is limited to move within the loop groove of the rotation plate 7, for keeping precision of movement length of the driving wire 10, so as to ensure reliability of emergency braking with the system of the present invention when accident happens.

A throttle-misoperation threshold is defined as a min force borne by the throttle pedal when throttle-misoperation happens; when two pins of the sensor switch K0 contact with each other and conduct electricity, a switch threshold is defined as an elastic force of an elastic element of the sensor switch K0; a position of the sensor switch K0 is arranged in such a manner that the switch threshold represents the throttle-misoperation threshold, wherein the switch threshold equals to the throttle-misoperation threshold;

wherein the sensor switch K0 is a switch which conducts electricity and turns on by contacting the two pins with each other when the elastic element of the sensor switch K0 is deformed under a switch threshold pressure.

The sensor switch K0 is a spring sensor switch or a disc sensor switch;

wherein the spring sensor switch comprises a slid barrel, a hollow spiral spring, a cross-shaped piston, a first electric contactor and a second electric contactor; wherein the hollow spiral spring is provided inside the slid barrel, two ends of the hollow spiral spring are respectively connected to a bottom of the slid barrel and a piston plate of the cross-shaped piston; the piston plate of the cross-shaped piston is provided at a top of the slid barrel, a first section of a middle column of the cross-shaped piston extends out of a center hold of a drilled cap of the slid barrel, and a bearing block is provided at a top end of the first section; a second section of the middle column is provided inside a first loop of the hollow spiral spring, the first electric contactors is provided at an end of the second section in the first loop; the second electric contactor is provided inside a second loop of the hollow spiral spring at the bottom of the slid barrel; the first electric contactor at the end of the second section of the middle column and the second electric contactor at the bottom of the slid barrel form a gap and are corresponding to each other in positions;

wherein the disc sensor switch comprises an elastic concave block, a non-elastic baseboard, a third electric contactor and a fourth electric contactor; a concave face of the elastic concave block is directed to and mounted on the non-elastic baseboard; in a space between the elastic concave block and the non-elastic baseboard, the third electric contactor is mounted on the concave face, and the fourth electric contactor is mounted on a surface of the non-elastic baseboard; the third electric contactor and the fourth electric contactor form a gap and are corresponding to each other in positions.

The automobile body part corresponding to the throttle pedal is a fixed part to which an accelerating movement of the throttle pedal is directed when the automobile is under a normal accelerating state, and the throttle pedal moves towards the fixed part when accelerating.

The automobile body part corresponding to the throttle pedal connecting rod is a fixed part to which an accelerating movement of the throttle pedal connecting rod is directed when the automobile is under the normal accelerating state, and the throttle pedal connecting rod moves towards the fixed part when accelerating.

A proper elastic coefficient of the elastic element of the sensor switch K0 is used for setting a pressure switch threshold. If the throttle-misoperation threshold is defined as a force applied on the throttle pedal which is no less than 10 Kg, then the switch threshold is defined as a force applied on the sensor switch K0 through which the throttle-misoperation threshold turns on the sensor switch K0. Under a switch threshold state, the sensor switch K0 is turned on. When the force applied on the throttle pedal is less than the throttle-misoperation threshold, then the force applied on the sensor switch K0 is less than the switch threshold, the sensor switch K0 is turned off, and the throttle recovers to normally accelerate.

As long as the two electric contactors of the sensor switch K0 are powered, when the two electric contactors contact with each other, the sensor switch K0 outputs electric signals. The electric signals are a mark of throttle-misoperation, and are starting signals for the following correction of throttle-misoperation.

That is to say, a min force for the two electric contactors of the sensor switch K0 to contact and conduct electricity is not necessary to equal to a min force of the driver when stepping on the throttle pedal by mistake. For representing throttle-misoperation by the electric signals formed by that the two electric contactors of the sensor switch K0 contacts and conducts electricity, the position of the switch sensor K0 and the min force (the switch threshold) for contacting and conducting electricity cooperate with each other for correctly represents the min force (the throttle-misoperation threshold) which the driver applies on the throttle pedal; which means the throttle-misoperation threshold is represented by cooperation of the position of the switch sensor K0 and the switch threshold. If the throttle-misoperation threshold is 10 Kg and the switch sensor K0 is placed on the throttle pedal connecting rod between the throttle pedal and a rotation point of the throttle pedal, because a force arm of the sensor switch K0 is shorter than a force arm of the throttle pedal, according to a lever principle, when the switch threshold is reached, which means that two electric contactors of the sensor switch K0 conduct electricity, the min force on the elastic element of the sensor switch K0 is larger than 10 Kg. If the throttle-misoperation threshold is 10 Kg and is not changed while the sensor switch K0 is set at a different place, the switch threshold of the elastic element will be different. Generally, the throttle-misoperation threshold is different from the switch threshold of the elastic element. Therefore, the sensor switch K0 with a fixed switch threshold is only able to be placed at a certain position on the throttle pedal or the throttle pedal connecting rod for normally working, which means the switch threshold correctly represents the throttle-misoperation threshold, which also means the position of the sensor switch K0 enables the switch threshold to be corresponding to the throttle-misoperation threshold.

The sensor switch K0 is a device for sensing the force borne by the throttle pedal or the throttle pedal connecting rod. Therefore, the sensor switch K0 is able to be placed on the surface of the throttle pedal or the throttle pedal connecting rod facing the automobile, or be placed at the automobile body part corresponding to the throttle pedal or the throttle pedal connecting rod.

Because the sensor switch K0 is placed on the throttle pedal connecting rod or the automobile body part corresponding to the throttle pedal connecting rod, force bearing of the sensor switch K0 is not interfered by a floor blanket in a cab and dropping events. Judging from reliability of sensing throttle-misoperation, the sensor switch placed on the throttle pedal connecting rod or the automobile body part corresponding to the throttle pedal connecting rod has better reliability.

The sensor switch K0 is a spring sensor switch K0 or a disc sensor switch K0;

wherein the spring sensor switch comprises a slid barrel, a hollow spiral spring, a cross-shaped piston, a first electric contactor and a second electric contactor; wherein the hollow spiral spring is provided inside the slid barrel, two ends of the hollow spiral spring are respectively connected to a bottom of the slid barrel and a piston plate of the cross-shaped piston; the piston plate of the cross-shaped piston is provided at a top of the slid barrel, a first section of a middle column of the cross-shaped piston extends out of a center hold of a drilled cap of the slid barrel, and a bearing block is provided at a top end of the first section; a second section of the middle column is provided inside a first loop of the hollow spiral spring, the first electric contactors is provided at an end of the second section in the first loop; the second electric contactor is provided inside a second loop of the hollow spiral spring at the bottom of the slid barrel; the first electric contactor at the end of the second section of the middle column and the second electric contactor at the bottom of the slid barrel form a gap and are corresponding to each other in positions.

A proper elastic coefficient of the spring of the spring sensor switch K0 is used for setting a pressure switch threshold. If the throttle-misoperation threshold is defined as a force applied on the throttle pedal which is no less than 10 Kg, then the switch threshold is defined as a force applied on the spring through which the throttle-misoperation threshold turns on the spring sensor switch K0, wherein the switch threshold is a force borne by the spring by which the first electric contactor at the end of the middle column contacts with the second electric contactor at the bottom of the slid barrel. Under a switch threshold state, the spring sensor switch K0 is turned on. When the force applied on the throttle pedal is less than the throttle-misoperation threshold of 10 Kg, then the force applied on the spring sensor switch K0 is less than the switch threshold, the spring sensor switch K0 is turned off, and the throttle recovers to normally accelerate.

The disc sensor switch comprises an elastic concave block, a non-elastic baseboard, a third electric contactor and a fourth electric contactor; a concave face of the elastic concave block is directed to and mounted on the non-elastic baseboard; in a space between the elastic concave block and the non-elastic baseboard, the third electric contactor is mounted on the concave face, and the fourth electric contactor is mounted on a surface of the non-elastic baseboard; the third electric contactor and the fourth electric contactor form a gap and are corresponding to each other in positions.

A proper elastic coefficient of the elastic concave block of the disc sensor switch K0 is used for setting a pressure switch threshold. If the throttle-misoperation threshold is defined as a force applied on the throttle pedal which is no less than 10 Kg, then the switch threshold is defined as a force applied on the elastic concave block through which the throttle-misoperation threshold turns on the disc sensor switch K0, wherein the switch threshold is a force borne by the elastic concave block by which the third electric contactor on the elastic concave block contacts with the fourth electric contactor on the non-elastic baseboard. Under a switch threshold state, the disc sensor switch K0 is turned on. When the force applied on the throttle pedal is less than the throttle-misoperation threshold of 10 Kg, then the force applied on the disc sensor switch K0 is less than the switch threshold, the disc sensor switch K0 is turned off, and the throttle recovers to normally accelerate.

A characteristic of the sensor switch K0 is that the elastic coefficient of the elastic element is used for setting the switch threshold of the force causing the throttle-misoperation. The switch threshold may be different from the throttle-misoperation threshold, but must be corresponding to the throttle-misoperation threshold. That is to say, when the force on the throttle pedal triggers the throttle-misoperation threshold, the sensor switch K0 must be under the switch threshold state.

The sensor switch K0 is a switch collecting the throttle-misoperation signals, and is an automatic switch satisfying certain conditions, which means the sensor switch K0 is automatically turned on when the driver applies too much power on the throttle pedal.

Advantages of the present invention are as follows. The relay reversed power controller uses the relay switch set, whose reliability is far better than the microelectronic controller, as a reversed power switch of a direct power source. The relay reversed switch, i.e. the relay reversed power controller, is used for controlling three states of the decelerating braking or the throttle-misoperation remedial braking: starting the break, releasing the break, and resetting, in such a manner that controller devices of the decelerating braking or the throttle-misoperation remedial braking has extremely-high reliability. In addition, the relay reversed power controller is able to provide a double-state circle required by the anti-collision controller: starting the brake, releasing the brake, starting the brake again, releasing the brake again, etc. The relay reversed power controller is able to circulate starting the brake and releasing the break when the direct current geared motor 1 is not returned to an initial state.

The sensor switch K0 collects the throttle-misoperation signals, and the anti-collision controller collects decelerating breaking signals. Because the sensor switch K0 is connected to the output end switch K7 of the anti-collision controller in parallel, the throttle-misoperation remedial braking and the decelerating braking share the relay reversed power controller and the limit-switch-integrated motor assembly. The throttle-misoperation remedial braking is hardly used, and in case of utilization, extremely-high reliability is needed. However, high reliability is not able to be guaranteed when the accident happens if the system is not used for a long time. The decelerating braking of the present invention is daily used, and daily utilization thereof has a function of daily detecting whether the throttle-misoperation remedial braking system is able to handle throttle-misoperation accidents well. That is to say, the decelerating braking of the present invention provides daily detection for the throttle-misoperation braking function, which increases the reliability of the throttle-misoperation braking function for avoiding terrible accidents.

The signal detector of the anti-collision controller is a sensor for detecting a dynamic distance between a moving automobile and a blocker ahead. Of course, the signal detector may sense other things. The signal detector is arranged in the front of the automobile so as to prevent the moving automobile from collision with the blocker ahead, and avoid collision with the blocker ahead when starting or stopping the automobile. The signal detector is arranged at the rear of the automobile so as to avoid collision with the blocker behind when starting or stopping the automobile. That is to say, collision is avoided during driving, starting and stopping the automobile.

A position information feedback switch relating to the rotation position, i.e. the control switch K6, is arranged on shell and the rotation plate executing mechanical action. The control switch K6 feeds back and controls the direct current geared motor to change from a releasing brake state when the accident is avoided to a recovered state where the automobile is stopped and waits for starting the brake again.

The rotation plate of the direct current geared motor is an eccentric rotation plate, which is suitable for throttle-misoperation remedial system which requires rapid start and large force during locked-rotating A pressure sensor, which directly obtains the throttle-misoperation signals and needs no microelectronic circuit, analyzes accelerating actions whit difference forces applied for finding out throttle-misoperation. According to the present invention, the pressure trigger switch only needs to be place at a certain position where throttle pedal displacement and force bearing state are able to be represented, then throttle switch electric signals are able to be obtained by directing setting the switch threshold of the elastic element.

BRIEF DESCRIPTION OF THE DRAWINGS

FIG. 1 is a schematic view of a control circuit and a structure of the present invention under a standby state.

ELEMENT REFERENCE

1—direct current geared motor, 2—relay reversed power controller, 3—limit-switch-integrated motor assembly, 4—sleeved stretching rope, 5—automobile brake pedal, 6—shell, 7—rotation plate, 8—electrical contacting pin, 9—stretching rope hole, 10—driving wire, 11—anti-collision controller, 12—anti-collision relay, 13—signal analyzer, 14—signal detector.

DETAILED DESCRIPTION OF THE PREFERRED EMBODIMENT

According to a preferred embodiment 1, an automobile anti-collision and anti-misoperation throttle system with a relay for controlling positive-negative rotation of a motor is provided, whose spring pressure trigger switch is placed on a back of a throttle pedal.

Referring to FIG. 1, the automobile anti-collision and anti-misoperation throttle system comprises a sensor switch K0, a sleeved stretching rope 4, an automobile brake pedal 5 and batteries, wherein the automobile anti-collision and anti-misoperation throttle system further comprises a relay reversed power controller 2 and a limit-switch-integrated motor assembly 3; wherein the sensor switch K0 is connected to and controls the relay reversed power controller 2, the relay reversed power controller 2 controls and supplies electric power to the limit-switch-integrated motor assembly 3, the limit-switch-integrated motor assembly 3 drives the sleeved stretching rope 4, the limit-switch-integrated motor assembly 3 also cuts off a reversed power circuit of the relay reversed power controller 2, and the sleeved stretching rope 4 transmits a motor rotation drift of the limit-switch-integrated motor assembly 3 to the automobile brake pedal 5; the sensor switch K0 is connected to an anti-collision controller 11 in parallel, for respectively controlling the automobile brake pedal 5;

wherein the relay reversed power controller 2 comprises a switch set and a fifth controlled switch K5; wherein the switch set comprises a first control coil M1, a first controlled switch K1, a second controlled switch K2, a third controlled switch K3 and a fourth controlled switch K4; wherein connection thereof is: a first end of the first controlled switch K1 and a first end of the second controlled switch K2 are connected to each other for being a first output end B1 of the relay reversed power controller 2, a second end of the first controlled switch K1 is connected to a positive electrode of a second battery D2, a second end of the second controlled switch K2 is connected to a negative electrode of the second battery D2; a first end of the third controlled switch k3 is connected to the fifth controlled switch K5 in series, and then the fifth controlled switch K5 is connected to the fourth controlled switch K4 for being a second output end B2 of the relay reversed power controller 2, a second end of the third controlled switch K3 is connected to the negative electrode of the second battery D2, and an end of the fourth controlled switch K4 is connected to the positive electrode of the second battery D2; a control end of the fifth controlled switch K5 is a second control coil M2; the first output end B1 and the second output end B2 are respectively connected to a direct current geared motor 1 of the limit-switch-integrated motor assembly 3;

wherein the limit-switch-integrated motor assembly 3 comprises the direct current geared motor 1, a shell 6 and a rotation plate 7, wherein the rotation plate 7 is mounted on an output shaft of the direct current geared motor 1 and is provided inside the shell 6, and the shell 6 is mounted on a shell body of the direct current geared motor 1; between the shell 6 and the rotation plate 7, two electrical contacting pins 8 are respectively provided on the shell 6 and the rotation plate 7; when the rotation plate 7 rotates to a standby position, the electrical contacting pins 8 of the shell 6 and the rotation plate 7 contact with each other for conducting electricity; when the rotation plate 7 rotates away from the standby position, the electrical contacting pins 8 of the shell 6 and the rotation plate 7 separate from each other for interrupting electricity;

wherein a stretching rope hole 9 is provided on the shell 6, a first end of a driving wire 10 in the sleeved stretching rope 4 is connected to the rotation plate 7 through the stretching rope hole 9; a second end of the driving wire 10 is connected to the automobile brake pedal 5, two ends of a sleeve of the sleeved stretching rope 4 are respectively connected to the shell 6 of the limit-switch-integrated motor assembly 3 and an automobile body part corresponding to the automobile brake pedal 5;

wherein a control circuit of the sensor switch K0 is a closed circuit comprising the sensor switch K0, a first battery D1 and the first control coil M1 of the relay reversed power controller 2 connected to each other in series;

wherein a cut-off reversed power circuit and a device thereof comprise: a closed circuit comprising a control switch K6, a third battery D3 and the second control coil M2 of the relay reversed power controlled 2 connected to each other in series; wherein the control switch K6 comprises the electrical contacting pins 8 of the shell 6 and the rotation plate 7.

A structure of the sensor switch K0 and connection between the sensor switch K0 and the throttle pedal are as follows.

[1] The structure of the sensor switch K0: according to the preferred embodiment 1, the structure of the sensor switch K0 is a spring sensor switch K0 comprising a slid barrel, a hollow spiral spring, a cross-shaped piston, a first electric contactor and a second electric contactor; wherein the hollow spiral spring is provided inside the slid barrel, two ends of the hollow spiral spring are respectively connected to a bottom of the slid barrel and a piston plate of the cross-shaped piston; the piston plate of the cross-shaped piston is provided at a top of the slid barrel, a first section of a middle column of the cross-shaped piston extends out of a center hold of a drilled cap of the slid barrel, and a bearing block is provided at a top end of the first section; a second section of the middle column is provided inside a first loop of the hollow spiral spring, the first electric contactors is provided at an end of the second section in the first loop; the second electric contactor is provided inside a second loop of the hollow spiral spring at the bottom of the slid barrel; the first electric contactor at the end of the second section of the middle column and the second electric contactor at the bottom of the slid barrel form a gap and are corresponding to each other in positions.

The gap between the first electric contactor and the second electric contactor is less than a distance between a top face of the bearing block and an external face of the slid barrel, in such a manner that the first electric contactor and the second electric contactor contact with each other and conduct electricity at least when the bearing block reaches a max bearing displacement. The spring sensor switch K0 is able to send electric signals for starting correction of throttle-misoperation.

A proper elastic coefficient of the spring of the spring sensor switch K0 is used for setting a pressure switch threshold. If the throttle-misoperation threshold is defined as a force applied on the throttle pedal which is no less than 10 Kg, then the switch threshold is defined as a force applied on the spring through which the throttle-misoperation threshold turns on the spring sensor switch K0, wherein the switch threshold is a force borne by the spring by which the first electric contactor at the end of the middle column contacts with the second electric contactor at the bottom of the slid barrel. Under a switch threshold state, the spring sensor switch K0 is turned on. When the force applied on the throttle pedal is less than the throttle-misoperation threshold of 10 Kg, then the force applied on the spring sensor switch K0 is less than the switch threshold, the spring sensor switch K0 is turned off, and the throttle recovers to normally accelerate.

[2] A position of the sensor switch K0: the spring sensor switch K0 is placed at a back of the throttle pedal, and the bearing block thereof facing a corresponding automobile body part; a distance between the bearing block and the corresponding automobile body part satisfies that when a force applied on the throttle pedal is less than 8 Kg, the bearing block does not contact with the corresponding automobile body part, so as to normally accelerate; only when the force applied on the throttle pedal is more than 8 Kg, the bearing block contacts with the corresponding automobile body part; when the force applied on the throttle pedal is no less than the throttle-misoperation threshold of 10 Kg, the spring is compacted, in such a manner that the first electric contactor and the second electric contactor contact with each other and conduct electricity, and the spring sensor switch K0 reaches the switch threshold for output the electric signals; a normal accelerating distance is provided between the sensor switch K0 and the correspond automobile body part of the throttle pedal.

When the system is under a standby state, states of the above switches are as follows: the first control coil M1, the first controlled switch K1, the second controlled switch K2, the third controlled switch K3 and the fourth controlled switch K4 are combined as a relay set, the sensor switch K0 is turned off, the first controlled switch K1 is turned on, the second controlled switch K2 is turned off, the third controlled switch K3 is turned on and the fourth controlled switch K4 is turned off; the second control coil M2 and the fifth controlled switch K5 are combined as a relay, and the fifth controlled switch K5 is turned off.

For decelerating brake when a blocker occurs, or for emergency brake when throttle-misoperation happens, a process of outputting normal electric power for braking is as follows: the output end switch K7 of the sensor switch K0 is turned on, the first controlled switch K1 is turned off, the second controlled switch K2 is turned on, the third controlled switch K3 is turned off, and the fourth controlled switch K4 is turned on. A current direction when the direct current geared motor 1 normally rotates for braking is as follows: from the positive electrode of the second battery D2, the fourth controlled switch K4 which is turned on, a positive end E of the direct current geared motor 1, a negative end F of the direct current geared motor 1, the second controlled switch K2 which is turned on, to the negative electrode of the second battery D2; wherein due to rotation of the rotation plate 7, the two pins 8 on the shell 6 and the rotation plate 7 are separated from each other, which means the control switch is turned off, and the fifth controlled switch K5 is turned from off to on. Because the third controlled switch K3 is turned off, the fifth controlled switch K5 is not able to conduct electricity. A reason for turning on the fifth controlled switch K5 is for releasing the brake with a reversed electric power with the accident is avoided. A difference between the decelerating brake and the emergency brake is that a rotation time of the direct current geared motor 1 a target automobile speed are different.

When the accident is avoided, a process for releasing the brake with the reversed electric power is as follows: the sensor switch K0 is turned off, the first controlled switch K1 is turned on, the second controlled switch K2 is turned off, the third controlled switch K3 is turned on, the fourth controlled switch K5 is turned off, and the fifth controlled switch K5 is turned on. A current direction when the direct current geared motor 1 reversely rotates for braking is as follows: from the positive electrode of the second battery D2, the first controlled switch K1 which is turned on, the positive end E of the direct current geared motor 1, the negative end F of the direct current geared motor 1, the fifth controlled switch K5 which is turned on, the third controlled switch which is turned off, to the negative electrode of the second battery D2; wherein when the rotation plate 7 rotates to a position where the two pins 8 on the shell 6 and the rotation plate 7 contact with each other, the second control coil turns the fifth controlled switch K5 from on to off, in such a manner that a brake releasing process is completed, and the system recover to the standby state.

A control circuit of the anti-collision controller 11 comprises an anti-collision relay 12, a fourth battery D4, a signal analyzer 13 and a signal detector 14; wherein an output end switch K7 of the anti-collision relay 12 is connected to the sensor switch K0 in parallel; a control signal coil M3 of the anti-collision relay 12, the fourth battery D4 and the signal analyzer 13 are connected to each other in series; the signal analyzer 13 is connected to the signal detector 14, and the signal detector 14 outputs signals to the signal analyzer 13; the signal detector 14 is provided in a front of or/and at a rear of an automobile, no blocker connected to the automobile is provided outside the signal detector 14.

According to a preferred embodiment 2, an automobile anti-collision and anti-misoperation throttle system with a relay for controlling positive-negative rotation of a motor is provided, which has an eccentric rotation plate.

Based on the automobile anti-collision and anti-misoperation throttle system as recited in the preferred embodiment 1, the rotation plate 7 on the output shaft of the direct current geared motor 1 has an eccentric wheel structure. When the direct current geared motor 1 normally rotates, the driving wire 10 is connected to a position of the rotation plate 7 where a linear velocity decreases, because when braking starts, the driving wire 10 bears a small force and the automobile brake pedal 5 is required to rapidly move to a braking direction, while when the automobile pedal 5 is at a braking position, the driving wire 10 bears a large force and moves a little. Until the accident is avoided, the automobile brake pedal 5 should be at a final braking position, which requires the direct current motor to be under a locked-rotating state, and applies a largest force on the driving wire 10.

A loop groove is provided on a side wall of the rotation plate 7, the driving wire 10 is connected to the loop groove of the rotation plate 7, and the stretching rope hole 9 of the shell 6 is corresponding to the loop groove of the rotation plate 7, in such a manner that the driving wire 10 is limited to move within the loop groove of the rotation plate 7, for keeping precision of movement length of the driving wire 10, so as to ensure reliability of emergency braking with the system of the present invention when accident happens.

According to a preferred embodiment 3, an automobile anti-collision and anti-misoperation throttle system with a relay for controlling positive-negative rotation of a motor is provided, whose spring sensor switch K0 is placed on a corresponding automobile body part of a back of a throttle pedal.

Based on the system as recited in the preferred embodiment 2, a structure of the sensor switch K0 and connection between the sensor switch K0 and the throttle pedal are as follows.

[1] The structure of the sensor switch K0: the structure is the same as in the preferred embodiment 1.

[2] A position of the sensor switch K0: the spring sensor switch K0 is placed at a corresponding automobile body part of a back of the throttle pedal, and the bearing block thereof facing a corresponding automobile body part; a distance between the bearing block and the corresponding automobile body part satisfies that when a force applied on the throttle pedal is less than 8 Kg, the bearing block does not contact with the corresponding automobile body part, so as to normally accelerate; only when the force applied on the throttle pedal is more than 8 Kg, the bearing block contacts with the corresponding automobile body part; when the force applied on the throttle pedal is no less than the throttle-misoperation threshold of 10 Kg, the spring is compacted, in such a manner that the first electric contactor and the second electric contactor contact with each other and conduct electricity, and the spring sensor switch K0 reaches the switch threshold for output the electric signals; a normal accelerating distance is provided between the sensor switch K0 and the correspond automobile body part of the throttle pedal.

According to a preferred embodiment 4, an automobile anti-collision and anti-misoperation throttle system with a relay for controlling positive-negative rotation of a motor is provided, whose spring sensor switch K0 is placed on a corresponding automobile body part of a throttle pedal connecting rod.

Based on the system as recited in the preferred embodiment 2, a structure of the sensor switch K0 and connection between the sensor switch K0 and the throttle pedal are as follows.

[1] The structure of the sensor switch K0: the structure is the same as in the preferred embodiment 3.

[2] A position of the sensor switch K0: the spring sensor switch K0 is placed at a corresponding automobile body part of the throttle pedal connecting rod, and the bearing block thereof facing a back of the throttle pedal connecting rod; a distance between the bearing block and the back of the throttle pedal connecting rod satisfies that when a force applied on the throttle pedal is less than 8 Kg, the bearing block does not contact with the back of the throttle pedal connecting rod, so as to normally accelerate; only when the force applied on the throttle pedal is more than 8 Kg, the bearing block contacts with the back of the throttle pedal connecting rod; when the force applied on the throttle pedal is no less than the throttle-misoperation threshold of 10 Kg, the spring is compacted, in such a manner that the first electric contactor and the second electric contactor contact with each other and conduct electricity, and the spring sensor switch K0 reaches the switch threshold for output the electric signals.

According to a preferred embodiment 5, an automobile anti-collision and anti-misoperation throttle system with a relay for controlling positive-negative rotation of a motor is provided, whose disc sensor switch K0 is placed on a front of a throttle pedal.

Based on the system as recited in the preferred embodiment 2, a structure of the sensor switch K0 and connection between the sensor switch K0 and the throttle pedal are as follows.

[1] The structure of the sensor switch K0: the disc sensor switch K0 comprises an elastic concave block, a non-elastic baseboard, a third electric contactor and a fourth electric contactor; a concave face of the elastic concave block is directed to and mounted on the non-elastic baseboard; in a space between the elastic concave block and the non-elastic baseboard, the third electric contactor is mounted on the concave face, and the fourth electric contactor is mounted on a surface of the non-elastic baseboard; the third electric contactor and the fourth electric contactor form a gap and are corresponding to each other in positions.

A proper elastic coefficient of the elastic concave block of the disc sensor switch K0 is used for setting a pressure switch threshold. If the throttle-misoperation threshold is defined as a force applied on the throttle pedal which is no less than 10 Kg, then the switch threshold is defined as a force applied on the elastic concave block through which the throttle-misoperation threshold turns on the disc sensor switch K0, wherein the switch threshold is a force borne by the elastic concave block by which the third electric contactor on the elastic concave block contacts with the fourth electric contactor on the non-elastic baseboard. Under a switch threshold state, the disc sensor switch K0 is turned on. When the force applied on the throttle pedal is less than the throttle-misoperation threshold of 10 Kg, then the force applied on the disc sensor switch K0 is less than the switch threshold, the disc sensor switch K0 is turned off, and the throttle recovers to normally accelerate.

The gap is provided between the third electric contactor and the fourth electric contactor, wherein a width of the gap ensures that when a force applied on the disc sensor switch K0 is less than the switch threshold, the third electric contactor and the fourth electric contactor are separated for normally accelerating. When the force applied on the disc sensor switch K0 is no less than the switch threshold, the third electric contactor and the fourth electric contactor contact with each other to send electric signals for starting correction of throttle-misoperation.

[2] A position of the sensor switch K0: the disc sensor switch K0 is place at a front of the throttle pedal which is contacted by a foot when stepping on the throttle pedal; when the force applied on the disc sensor switch K0 when the throttle pedal is stepped on is less than 10 Kg, the automobile is normally accelerated; only when the force applied on the disc sensor switch K0 when the throttle pedal is stepped on is larger than 10 Kg, the third electric contactor and the fourth electric contactor contact with each other and the disc sensor switch K0 sends electric signals. With the disc sensor switch K0, the throttle-misoperation threshold of the force applied on the throttle pedal equals to the switch threshold of the force applied on the disc sensor switch K0.

What is claimed is:

1. An automobile anti-collision and anti-misoperation throttle system with a relay for controlling positive-negative rotation of a motor, comprising: a sensor switch (K0), a sleeved stretching rope (4), an automobile brake pedal (5) and batteries, wherein the automobile anti-collision and anti-misoperation throttle system further comprises a relay reversed power controller (2), a limit-switch-integrated motor assembly (3) and an anti-collision controller (11); wherein the sensor switch (K0) is connected to and controls the relay reversed power controller (2), the relay reversed power controller (2) controls and supplies electric power to the limit-switch-integrated motor assembly (3), the limit-switch-integrated motor assembly (3) drives the sleeved stretching rope (4), the limit-switch-integrated motor assembly (3) also cuts off a reversed power circuit of the relay reversed power controller (2), and the sleeved stretching rope (4) transmits a motor rotation drift of the limit-switch-integrated motor assembly (3) to the automobile brake pedal (5); the sensor switch (K0) is connected to the anti-collision controller (11) in parallel, for respectively controlling the automobile brake pedal (5);

wherein the relay reversed power controller (2) comprises a switch set and a fifth controlled switch (K5); wherein the switch set comprises a first control coil (M1), a first controlled switch (K1), a second controlled switch (K2), a third controlled switch (K3) and a fourth controlled switch (K4); wherein connection thereof is: a first end of the first controlled switch (K1) and a first end of the second controlled switch (K2) are connected to each other for being a first output end (B1) of the relay reversed power controller (2), a second end of the first controlled switch (K1) is connected to a positive electrode of a second battery (D2), a second end of the second controlled switch (K2) is connected to a negative electrode of the second battery (D2); a first end of the third controlled switch (k3) is connected to the fifth controlled switch (K5) in series, and then the fifth controlled switch (K5) is connected to the fourth controlled switch (K4) for being a second output end (B2) of the relay reversed power controller (2), a second end of the third controlled switch (K3) is connected to the negative electrode of the second battery (D2), and an end of the fourth controlled switch (K4) is connected to the positive electrode of the second battery (D2); a control end of the fifth controlled switch (K5) is a second control coil (M2); the first output end (B1) and the second output end (B2) are respectively connected to a direct current geared motor (1) of the limit-switch-integrated motor assembly (3);

wherein the limit-switch-integrated motor assembly (3) comprises the direct current geared motor (1), a shell (6) and a rotation plate (7), wherein the rotation plate (7) is mounted on an output shaft of the direct current geared motor (1) and is provided inside the shell (6), and the shell (6) is mounted on a shell body of the direct current geared motor (1); between the shell (6) and the rotation plate (7), two electrical contacting pins (8) are respectively provided on the shell (6) and the rotation plate (7); the electrical contacting pins (8) of the shell (6) and the rotation plate (7) contact with each other for conducting electricity or separate for interrupting electricity;

wherein a stretching rope hole (9) is provided on the shell (6), a first end of a driving wire (10) in the sleeved stretching rope (4) is connected to the rotation plate (7) through the stretching rope hole (9); a second end of the driving wire (10) is connected to the automobile brake pedal (5), two ends of a sleeve of the sleeved stretching rope (4) are respectively connected to the shell (6) of the limit-switch-integrated motor assembly (3) and an automobile body part corresponding to the automobile brake pedal (5);

wherein a control circuit of the sensor switch (K0) is a closed circuit comprising the sensor switch (K0), a first battery (D1) and the first control coil (M1) of the relay reversed power controller (2) connected to each other in series;

wherein a cut-off reversed power circuit and a device thereof comprise: a closed circuit comprising a control switch (K6), a third battery (D3) and the second control coil (M2) of the relay reversed power controlled (2) connected to each other in series; wherein the control switch (K6) comprises the electrical contacting pins (8) of the shell (6) and the rotation plate (7);

wherein a control circuit of the anti-collision controller (11) comprises an anti-collision relay (12), a fourth battery (D4), a signal analyzer (13) and a signal detector (14); wherein an output end switch (K7) of the anti-collision relay (12) is connected to the sensor switch (K0) in parallel; a control signal coil (M3) of the anti-collision relay (12), the fourth battery (D4) and the signal analyzer (13) are connected to each other in series; the signal analyzer (13) is connected to the signal detector (14), and the signal detector (14) outputs signals to the signal analyzer (13); the signal detector (14) is provided in a front of or/and at a rear of an automobile, no blocker connected to the automobile is provided outside the signal detector (14);

wherein the automobile anti-collision and anti-misoperation throttle system further comprises a throttle pedal and an automobile body part corresponding to the throttle pedal; or a throttle pedal connecting rod and an automobile body part corresponding to the throttle pedal connecting rod;

wherein the sensor switch (K0) is provided on a front side of the throttle pedal;

or the sensor switch (K0) is provided on a rear side of the throttle pedal, an interval is provided between the sensor switch (K0) and the automobile body part corresponding to the throttle pedal; when the throttle pedal moves to a misoperation threshold state position, the sensor switch (K0) contacts with the throttle pedal;

or the sensor switch (K0) is provided on a surface of the throttle pedal connecting rod facing the automobile, or the sensor switch (K0) is provided on the automobile body part corresponding to the throttle pedal connecting rod.

2. The automobile anti-collision and anti-misoperation throttle system, as recited in claim 1, wherein the rotation plate (7) mounted on the output shaft of the direct current geared motor (1) has an eccentric wheel structure.

3. The automobile anti-collision and anti-misoperation throttle system, as recited in claim 2, wherein a loop groove is provided on a side wall of the rotation plate (7), the driving wire (10) is connected to the loop groove of the rotation plate (7), and the stretching rope hole (9) of the shell (6) is corresponding to the loop groove of the rotation plate (7).

4. The automobile anti-collision and anti-misoperation throttle system, as recited in claim 3, wherein:

a throttle-misoperation threshold is defined as a min force borne by the throttle pedal when throttle-misoperation happens; when two pins of the sensor switch (K0) contact with each other and conduct electricity, a switch threshold is defined as an elastic force of an elastic element of the sensor switch (K0); a position of the sensor switch (K0) is arranged in such a manner that the switch threshold represents the throttle-misoperation threshold, wherein the switch threshold equals to the throttle-misoperation threshold;

the sensor switch (K0) is a switch which conducts electricity and turns on by contacting the two pins with each other when the elastic element of the sensor switch (K0) is deformed under a switch threshold pressure.

5. The automobile anti-collision and anti-misoperation throttle system, as recited in claim 4, wherein the sensor switch (K0) is a spring sensor switch or a disc sensor switch;

wherein the spring sensor switch (K0) comprises a slid barrel, a hollow spiral spring, a cross-shaped piston, a first electric contactor and a second electric contactor; wherein the hollow spiral spring is provided inside the slid barrel, two ends of the hollow spiral spring are respectively connected to a bottom of the slid barrel and a piston plate of the cross-shaped piston; the piston plate of the cross-shaped piston is provided at a top of the slid barrel, a first section of a middle column of the cross-shaped piston extends out of a center hold of a drilled cap of the slid barrel, and a bearing block is provided at a top end of the first section; a second section of the middle column is provided inside a first loop of the hollow spiral spring, the first electric contactors is provided at an end of the second section in the first loop; the second electric contactor is provided inside a second loop of the hollow spiral spring at the bottom of the slid barrel; the first electric contactor at the end of the second section of the middle column and the second electric contactor at the bottom of the slid barrel form a gap and are corresponding to each other in positions;

wherein the disc sensor switch (K0) comprises an elastic concave block, a non-elastic baseboard, a third electric contactor and a fourth electric contactor; a concave face of the elastic concave block is directed to and mounted on the non-elastic baseboard; in a space between the elastic concave block and the non-elastic baseboard, the third electric contactor is mounted on the concave face, and the fourth electric contactor is mounted on a surface of the non-elastic baseboard; the third electric contactor and the fourth electric contactor form a gap and are corresponding to each other in positions.

* * * * *